United States Patent
Daly et al.

(10) Patent No.: US 11,555,724 B2
(45) Date of Patent: Jan. 17, 2023

(54) METHOD AND A DEVICE FOR DETERMINING THE MASS FLOW RATE AND THE PRESENCE OR ABSENCE OF A LIQUID FLOWING IN A PIPE

(71) Applicant: DAIRYMASTER, Causeway (IE)

(72) Inventors: John Gerard Daly, Tralee (IE); Edmond Patrick Harty, Ballyheigue (IE); Christopher Kinsella, Listowel (IE)

(73) Assignee: DAIRYMASTER, County Kerry (IE)

( * ) Notice: Subject to any disclaimer, the term of this patent is extended or adjusted under 35 U.S.C. 154(b) by 0 days.

(21) Appl. No.: 16/596,998

(22) Filed: Oct. 9, 2019

(65) Prior Publication Data

US 2020/0056918 A1     Feb. 20, 2020

Related U.S. Application Data

(62) Division of application No. 15/023,147, filed as application No. PCT/IE2014/000015 on Sep. 19, 2014, now Pat. No. 10,480,975.

(51) Int. Cl.
    *G01F 1/76*      (2006.01)
    *G01F 1/72*      (2006.01)
    (Continued)

(52) U.S. Cl.
    CPC ............... *G01F 1/76* (2013.01); *A01J 5/01* (2013.01); *G01F 1/66* (2013.01); *G01F 1/666* (2013.01); *G01F 1/72* (2013.01); *G01F 1/74* (2013.01)

(58) Field of Classification Search
    CPC .......................................................... G01F 1/16
    See application file for complete search history.

(56) References Cited

U.S. PATENT DOCUMENTS

| 4,452,176 A | * | 6/1984 | Hoefelmayr | G01F 1/52 |
| | | | | 119/14.17 |
| 5,792,964 A | * | 8/1998 | van den Berg | A01J 5/01 |
| | | | | 73/861.15 |

(Continued)

FOREIGN PATENT DOCUMENTS

| EP | 0 953 829 A2 | 11/1999 |
| EP | 2 336 731 A1 | 6/2011 |

(Continued)

OTHER PUBLICATIONS

International Search Report for PCT/IE2014/000015 dated Feb. 5, 2015 (PCT/ISA/210).

(Continued)

*Primary Examiner* — Hyun D Park
(74) *Attorney, Agent, or Firm* — Sughrue Mion, PLLC

(57) ABSTRACT

A device (1) for determining the mass flow rate of milk turbulently flowing with air in a pipe (2) in pulsed milk slugs comprises sampling a signal from a microphone (8) of the device (1) indicative of sonic signals produced by the milk flow. The sampled signals are read by a microprocessor (15) which applies a Fast Fourier Transform to the sampled signal to produce the frequency domain of the sampled signal. The microprocessor (15) is configured to compute the average energy value of the sampled signal in the frequency bandwidth of 6 kHz to 15 kHz during consecutive monitoring periods. The average energy values are inserted into a calibration equation, which may be a power law equation, a polynomial equation, a logarithmic equation or any other such suitable equation in order to convert the average energy value to a mass flow rate of the milk flowing through the pipe 2 during that predefined monitoring period. The total mass flow of milk flowing through the pipeline (2) during a period from $T_1$ to $T_2$ is determined by integrating the determined mass flow rate of the milk from the time $T_1$ to the (Continued)

Figure 2:
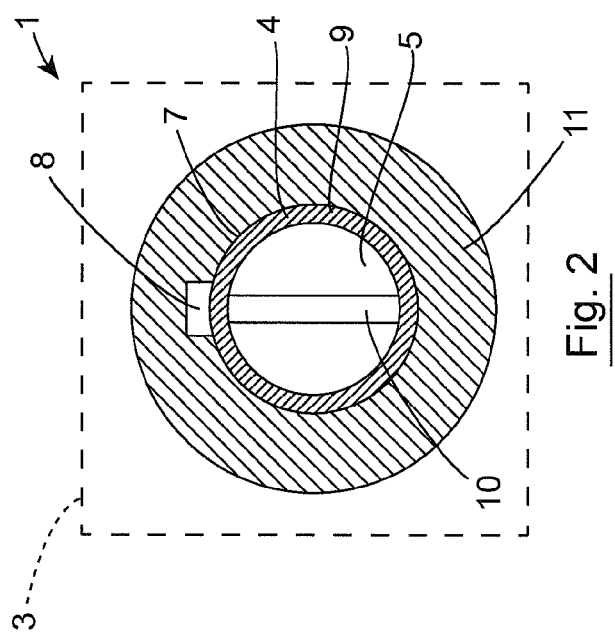

time $T_2$. Disengagement of a milking cluster from the teats of an animal as a result of kick-off during milking is also determined when the monitored signal from the microphone (8) transitions from the signal indicative of milk flowing in pulsed slugs to a continuous relatively high energy noise signal indicative of air being continuously drawn through the pipeline.

12 Claims, 1 Drawing Sheet

(51) Int. Cl.
*G01F 1/74* (2006.01)
*A01J 5/01* (2006.01)
*G01F 1/66* (2022.01)

(56) References Cited

U.S. PATENT DOCUMENTS

| | | | |
|---|---|---|---|
| 6,480,812 B1* | 11/2002 | Wada | G01F 1/329 702/191 |
| 6,508,109 B2 | 1/2003 | van den Berg | |
| 6,571,731 B1 | 6/2003 | Maier, Jr. | |
| 7,028,559 B2 | 4/2006 | Oort | |
| 2002/0148407 A1* | 10/2002 | Brown | A01J 5/01 119/14.02 |
| 2005/0034518 A1 | 2/2005 | Wamhof | |
| 2007/0044572 A1* | 3/2007 | Davis | G01F 1/704 73/861.42 |
| 2007/0199389 A1* | 8/2007 | Tombs | G01F 1/8468 73/861.357 |

FOREIGN PATENT DOCUMENTS

| | | |
|---|---|---|
| GB | 2 479 953 A | 11/2011 |
| WO | 89/005974 A1 | 6/1989 |
| WO | 01/029518 A1 | 4/2001 |
| WO | 2010/094809 A1 | 8/2010 |
| WO | 2013/070062 A1 | 5/2013 |

OTHER PUBLICATIONS

Written Opinion for PCT/IE2014/000015 dated Feb. 5, 2015 (PCT/ISA/237).
International Search Report for PCT/IE2014/000015 dated Feb. 5, 2015.
Written Opinion for PCT/IE2014/000015 dated Feb. 5, 2015.

* cited by examiner

METHOD AND A DEVICE FOR DETERMINING THE MASS FLOW RATE AND THE PRESENCE OR ABSENCE OF A LIQUID FLOWING IN A PIPE

CROSS REFERENCE TO RELATED APPLICATIONS

This application is a Divisional of application Ser. No. 15/023,147, filed Mar. 18, 2016, which is a National Stage of International Application No. PCT/IE2014/000015 filed Sep. 19, 2014, claiming priority based on Irish Patent Application No. S2013/0285 filed Sep. 19, 2013, the contents of all of which are incorporated herein by reference in their entirety.

The present invention relates to a method and a device for determining the mass flow rate of a liquid flowing in a pipe, and in particular, though not limited to a method and a device for determining the mass flow rate of a turbulently flowing liquid phase medium flowing with a gaseous phase medium in a pipe. In particular, the invention relates to a method and a device for determining the mass flow rate of milk flowing in intermittent slugs in a pipe with air, as for example, milk flowing in a milk line in animal milking apparatus as the milk is being drawn in pulses from the animal, although the invention is not limited to such a method and a device. Further, the invention relates to a method and a device for determining the presence or absence of milk flowing in a pipeline, and the invention also relates to a method and device for detecting the commencement and ending of milking of an animal. The invention further relates to a method and a device for detecting connection and disconnection of teat cups of a milking cluster to the teats of an animal, and the invention also relates to a method and a device for detecting disconnection ("kick-off") of a milking cluster from the teats of an animal during milking thereof.

Milking apparatus for milking animals is well known, and the action of milking apparatus whereby milk is drawn under vacuum from the teats of an animal in pulsed flow whereby the milk is drawn in time spaced apart slugs of milk with air intermediate the milk slugs is known. Because two-phase flow is involved, in other words, liquid and gaseous phase flow whereby the liquid phase comprises milk and the gaseous phase comprises air, it is relatively difficult to determine the rate of milk flow flowing through a pipeline where the milk is drawn under vacuum from the teats in such a pulsed flow manner. Furthermore, it is desirable to be able to detect both the presence and absence of milk flowing in a pipeline, and it is also desirable to be able to detect the commencement and completion of milking of an animal. Further, it is desirable to detect connection and disconnection of a milking cluster from the teats of an animal, and in particular, it is desirable to be able to detect disconnection of a milking cluster from the teats of an animal during milking, as a result of kick-off.

The present invention is directed towards providing a method and a device for determining the mass flow rate of a liquid flowing in a pipe. The invention is also directed towards a method and a device for detecting one or more of the presence or absence of milk flowing in a pipeline, the commencement and ceasing of milk flowing in a pipeline, the connection and disconnection of a milking cluster to the teats of an animal, and the invention is also directed towards a method and a device for detecting disconnection of a milking cluster from the teats of an animal during milking of the animal.

According to the invention there is provided a method for determining the mass flow rate of a liquid phase medium flowing in a pipe, the method comprising monitoring a signal indicative of a sonic signal produced by the flowing media, filtering the frequency domain of the monitored signal to produce a portion of the monitored signal within a predefined frequency bandwidth indicative of the flowing liquid phase medium, computing an energy parameter value of the portion of the monitored signal within the predefined frequency bandwidth, and determining the mass flow rate of the liquid phase medium from the computed energy parameter value.

According to the invention there is provided a method for determining the mass flow rate of a liquid phase medium flowing in a pipe, the method comprising monitoring a signal indicative of a sonic signal produced by the flowing media, filtering the frequency domain of the monitored signal to produce a portion of the monitored signal within a predefined frequency bandwidth indicative of the flowing liquid phase medium, computing an energy parameter value of the portion of the monitored signal within the predefined frequency bandwidth, and determining the mass flow rate of the liquid phase medium from the computed energy parameter value.

In one embodiment of the invention the mass flow rate of the flowing liquid phase medium is determined by comparing the computed energy parameter value of the monitored signal within the predefined frequency bandwidth with a system of calibration energy values and corresponding calibration mass flow rates, and determining the mass flow rate of the liquid phase medium as a function of the system of the calibration energy values and the corresponding calibration mass flow rates.

In another embodiment of the invention the energy parameter value of the monitored signal within the predefined frequency bandwidth is computed by computing the average energy value of the monitored signal within the predefined frequency bandwidth.

Preferably, the energy parameter value of the monitored signal within the predefined frequency bandwidth is computed by computing the average energy value of the energy values of the monitored signal over a predefined threshold energy value within the predefined frequency bandwidth.

In another embodiment of the invention the monitored signal is sampled at a predefined sampling rate. Preferably, the monitored signal is sampled during sequential predefined monitoring periods. Advantageously, the predefined monitoring periods run consecutively one after the other.

In one embodiment of the invention the frequency domain of the sampled monitored signal is produced by applying a Fast Fourier Transform to the sampled monitored signal.

Preferably, the average energy value of the sampled monitored signal within the predefined frequency bandwidth is computed at the end of each predefined monitoring period.

In one aspect of the invention the system of the calibration energy values and the corresponding calibration mass flow rates is expressed as a calibration equation. Preferably, the calibration equation comprises one of a power law equation, a polynomial equation, and a logarithmic equation. Advantageously, the mass flow rate of the liquid phase medium is determined from the calibration equation. Ideally, the mass flow rate of the liquid phase medium is determined from the calibration equation by substituting the computed energy parameter value of the monitored signal within the predefined frequency bandwidth in the calibration equation.

In one aspect of the invention the mass flow rate of the liquid phase medium is determined at the end of each predefined monitoring period for that predefined monitoring period.

In another aspect of the invention the total mass of the liquid phase medium flowing during each predefined monitoring period is determined.

In a further aspect of the invention the total mass of the liquid phase medium which flows during each predefined monitoring period is determined as the integral of the mass flow rate from time T1 to time T2, where time T1 is the time at the commencement of each predefined monitoring period and time T2 is the time at the end of each predefined monitoring period.

In one embodiment of the invention the monitored signal is derived from a microphone. Preferably, the monitored signal is derived from the electronic output signal from the microphone. Advantageously, the monitored signal comprises an analogue signal. Alternatively, the monitored signal comprises a digital signal.

In one aspect of the invention the microphone is located adjacent the pipe. Alternatively, the microphone is located within the pipe.

In one embodiment of the invention the predefined frequency bandwidth within which the energy parameter of the monitored signal is computed lies in the range of 6 kHz to 15 kHz.

In another embodiment of the invention the predefined frequency bandwidth within which the energy parameter of the monitored signal is computed lies in the range of 10 kHz to 15 kHz.

In one aspect of the invention the flowing liquid medium comprises a turbulently flowing liquid medium. Preferably, turbulence is induced in the flowing liquid medium.

In another aspect of the invention the liquid phase medium is flowing in the pipe with a gaseous phase medium.

In a further aspect of the invention the flow of the liquid phase medium in the pipe is a pulsated flow.

In another aspect of the invention the liquid phase medium flows in the pipe as a pulsed flow in the form of time spaced apart slugs of the liquid phase medium.

In one embodiment of the invention the liquid phase medium comprises milk.

In another embodiment of the invention the liquid phase medium comprises milk being drawn through a pipeline under vacuum from a teat of an animal by a milking machine.

In one embodiment of the invention the method further comprises determining the system of calibration energy values and the corresponding mass flow rates for the liquid phase medium, wherein the liquid phase medium is delivered through the pipe for predefined calibration periods at respective different mass flow rates of the liquid phase medium, the mass of the liquid phase medium delivered through the pipe during each predefined calibration period is recorded, and the mass flow rate of the liquid phase medium for each predefined calibration period is computed and recorded from the recorded mass of the liquid phase medium delivered through the pipe during the corresponding predefined calibration period, the signal indicative of a sonic signal produced by the flowing medium is monitored during each predefined calibration period, the frequency domain of the monitored signal is filtered to produce a portion of the monitored signal within the predefined bandwidth indicative of the flowing liquid phase medium, the energy parameter value of the portion of the monitored signal within the predefined frequency bandwidth for each predefined calibration period is computed, the computed energy parameter values are recorded cross-referenced with the corresponding mass flow rates of the liquid phase medium for the respective predefined calibration period, and the system of the calibration energy parameter values and the corresponding mass flow rates of the liquid phase medium is determined from the recorded computed energy parameter values cross-referenced with the corresponding mass flow rates of the liquid phase medium.

In one embodiment of the invention the computed energy parameter value of the portion of the monitored signal within the predefined frequency bandwidth which is computed for each predefined calibration period is the average energy value of the portion of the monitored signal within the predefined frequency bandwidth for that predefined calibration period.

In another embodiment of the invention the system of calibration energy parameter values and the corresponding mass flow rates for the liquid phase medium is expressed as a calibration equation, whereby the mass flow rate is defined as a function of the energy parameter value of the portion of the monitored signal within the predefined frequency bandwidth.

Preferably, the calibration equation comprises one of a power law equation, a polynomial equation, and a logarithmic equation.

Advantageously, the time duration of each predefined calibration period is similar to the time duration of each predefined monitoring period.

In one aspect of the invention the liquid phase medium is delivered through the pipe with a gaseous phase medium during calibration.

In another aspect of the invention the liquid phase medium is delivered through the pipe in the form of a pulsed flow during calibration.

In a further aspect of the invention the liquid phase medium is delivered through the pipe in the form of a pulsed flow with time spaced apart intermediate slugs of the liquid phase medium during calibration.

In one embodiment of the invention the method further comprises determining the absence of the liquid phase medium flowing in the pipe, the absence of the liquid phase medium flowing in the pipe being determined in response to a change in the pattern of the frequency domain of the sampled monitored signal within the predefined frequency bandwidth.

Preferably, the absence of flow of the liquid phase medium in the pipe is identified in response to the absence of pulses in the frequency domain of the sampled monitored signal within the predefined frequency bandwidth.

The invention also provides a method for detecting one or more of the presence of milk flowing in a pipeline, the absence of milk flowing in the pipeline, connection of teat cups of a milking cluster to the teats of an animal, disconnection of the teat cups of a milking cluster from the teats of an animal, the commencement of milk flowing in the pipeline, and the ceasing of milk to flow in the pipeline, the method comprising monitoring a signal indicative of a sonic signal produced by a medium flowing in the pipeline, filtering the frequency domain of the monitored signal to produce a portion of the monitored signal within a predefined frequency bandwidth indicative of milk flowing in the pipeline, computing an energy parameter value of the portion of the monitored signal within the predefined frequency bandwidth, and determining one or more of the presence of milk flowing in a pipeline, the absence of milk flowing in the pipeline, connection of teat cups of a milking cluster to the teats of an animal, disconnection of the teat cups of a milking cluster from the teats of an animal, the commencement of milk flowing in the pipeline, and the ceasing of milk to flow in the pipeline, from the computed energy parameter value.

In one embodiment of the invention the computed energy parameter value is compared with a first predefined energy parameter value indicative of air being drawn under vacuum into the pipeline through the teat cups, and disconnection of the milking cluster from the teats of the animal is determined in response to the computed energy parameter value exceeding the predefined energy parameter value.

In another embodiment of the invention the computed energy parameter value is compared with a second predefined energy parameter value indicative of the teat cups of the milking cluster being attached to the teats of the animal without milk flowing in the pipeline, and determining the absence of milk flowing in response to the computed energy parameter value being less than the second predefined energy parameter value.

In another embodiment of the invention the computed energy parameter value is compared with an upper third predefined energy parameter value and a lower third predefined energy parameter value indicative of milk flowing in the pipeline, and the presence of milk flowing in the pipeline is determined in response to the computed energy parameter value lying within the upper and lower third predefined energy parameter values.

In a further embodiment of the invention milk is determined as flowing in the pipeline in response to the computed energy parameter value being indicative of a liquid phase medium flowing with pulsed flow.

In one aspect of the invention a plurality of time spaced energy parameter values of the monitored signal within the predefined frequency bandwidth are computed, and the presence of milk flowing in the pipeline is determined in response to the time spaced computed energy parameter values being indicative of a liquid phase medium flowing with pulsed flow.

In another aspect of the invention the time spaced computed energy parameter values are consecutively computed energy parameter values.

In a further aspect of the invention the commencement of milk flowing in the pipeline is determined in response to the computed energy parameter value transitioning from one of a value indicative of the teat cups of the milking cluster being attached to the teats of the animal without milk flowing in the pipeline, and a value indicative of air being drawn under vacuum into the pipeline through the teat cups to a value indicative of milk flowing in the pipeline.

In another aspect of the invention the ceasing of milk to flow in the pipeline is determined in response to the computed energy parameter value transitioning from a value indicative of milk flowing in the pipeline to a value less than the second predefined energy parameter value.

In one aspect of the invention disconnection of the milking cluster from the teats of an animal during milking is determined in response to the computed energy parameter value transitioning from a value indicative of milk flowing in the pipeline to a value greater than the first predefined energy parameter value.

In another aspect of the invention connection of the milking cluster to the teats of the animal is determined in response to the computed energy parameter value transitioning from a value indicative of air being drawn into the pipeline through the teat cups to a value less than the upper third predefined energy parameter value.

In a further aspect of the invention connection of the milking cluster to the teats of the animal is determined in response to the computed energy parameter value transitioning from a value indicative of air being drawn into the pipeline through the teat cups to a value indicative of milk flowing in the pipeline.

In a still further aspect of the invention connection of the milking cluster to the teats of the animal is determined in response to the computed energy parameter value transitioning from a value indicative of air being drawn into the pipeline through the teat cups to a value less than the second predefined energy parameter value.

In one embodiment of the invention the computed energy parameter value of the monitored signal is computed by computing the average energy of the monitored signal within the predefined bandwidth.

Preferably, the average energy value of the monitored signal within the predefined bandwidth is computed at time spaced apart intervals.

In one aspect of the invention the average energy of the monitored signal within the predefined bandwidth is computed at the end of respective predefined monitoring periods.

In another aspect of the invention the monitored signal is sampled at a predefined sampling rate, and the average energy of the sampled signal within the predefined bandwidth is computed at the end of respective predefined sampling periods.

Preferably, each predefined monitoring period comprises a plurality of predefined sampling periods.

Advantageously, the respective predefined sampling periods run consecutively one after the other.

Preferably, the respective predefined monitoring periods run consecutively one after the other.

In one aspect of the invention the first predefined energy parameter value comprises an energy value.

In another aspect of the invention the second predefined energy parameter value comprises an energy value.

In a further aspect of the invention the upper and lower third predefined energy parameter values comprise respective energy values.

Preferably, the predefined frequency bandwidth lies in the range of 6 kHz to 15 kHz. Advantageously, the predefined frequency bandwidth lies in the range of 10 kHz to 15 kHz.

Further the invention provides a device for detecting one or more of the presence of milk flowing in a pipeline, the absence of milk flowing in the pipeline, connection of teat cups of a milking cluster to the teats of an animal, disconnection of the teat cups of a milking cluster from the teats of an animal, commencement of milk flowing in the pipeline, and the ceasing of milk flowing in the pipeline, the device comprising a monitoring means for monitoring a signal indicative of a sonic signal produced by a medium flowing in the pipeline, and a signal processor, the signal processor being configured to carry out the method according to the invention.

Additionally the invention provides a device for determining the mass flow rate of a liquid phase medium flowing in a pipe, the device comprising a monitoring means for monitoring a signal indicative of a sonic signal produced by the flowing media, a filtering means for filtering the frequency domain of the monitored signal to produce a portion of the monitored signal within a predefined frequency bandwidth indicative of the flowing liquid phase medium, and a signal processor configured to compute an energy parameter value of the monitored signal within the predefined frequency bandwidth, and to determine the mass flow rate of the liquid phase medium from the computed energy parameter value.

In one aspect of the invention the monitoring means comprises a means for monitoring the sonic signal produced by the flowing media.

In another aspect of the invention the monitoring means comprises a microphone.

In one aspect of the invention the microphone is located adjacent the pipe. Alternatively, the microphone is located within the pipe.

In another aspect of the invention the microphone comprises an analogue microphone. Alternatively, the microphone comprises a digital microphone.

In one embodiment of the invention a turbulence inducing means is located in the pipe. Preferably, the turbulence inducing means comprises a projection extending inwardly into the pipe from a pipe wall thereof.

In one embodiment of the invention the signal processor is configured to sample the signal produced by the monitoring means indicative of the sonic signal produced by the flowing medium at a predefined sampling rate during sequential predefined monitoring periods.

Preferably, the predefined monitoring periods run consecutively one after the other.

In one aspect of the invention the signal processor is configured to carry out a Fast Fourier Transform on the sampled monitored signal to produce the frequency domain of the sampled signal.

In another aspect of the invention the signal processor is configured as a filtering means to filter the frequency domain signal resulting from the Fast Fourier Transform to produce the portion of the signal within the predefined frequency bandwidth.

In a further aspect of the invention the signal processor is configured to compute the energy parameter value of the monitored signal within the predefined frequency bandwidth as the average energy value of the monitored signal within the predefined frequency bandwidth.

In one embodiment of the invention the device is configured for determining the mass flow rate of a liquid phase medium flowing in the pipe with a gaseous phase medium.

In another aspect of the invention the device is configured for determining the mass flow of a liquid phase medium flowing in a pipe with pulsed flow in the form of a plurality of time spaced apart intermittent slugs of the liquid phase medium.

In a further embodiment of the invention the device is further configured to determine the absence of the liquid phase medium flowing in the pipe in response to a change in the pattern of the signals within the predefined frequency domain bandwidth of the sampled monitored signal.

In a still further embodiment of the invention the device is configured to determine the absence of flow of the liquid phase medium in the pipe in the absence of a pulsed signal in the predefined frequency bandwidth of the frequency domain of the sampled monitored signal.

In one aspect of the invention the signal processor is configured to determine the mass flow rate by comparing the computed energy parameter value of the monitored signal within the predefined frequency bandwidth with a system of calibration energy values and corresponding calibration mass flow rates and determining the mass flow rate of the liquid phase medium as a function of the system of the calibration energy values and the corresponding calibration mass flow rates.

In one embodiment of the invention the system of the calibration energy values and the corresponding calibration mass flow rates is expressed in a calibration equation. Preferably, the calibration equation comprises one of a power law equation, a polynomial equation, and a logarithmic equation.

In one embodiment of the invention the mass flow rate of the liquid phase medium is determined from the calibration equation.

Preferably, the mass flow rate of the liquid phase medium is determined from the calibration equation by substituting the computed energy parameter value in the calibration equation.

Advantageously, the signal processor is configured to determine the total mass of the liquid phase medium during each predefined monitoring period.

Preferably, the total mass of the liquid phase medium which flows during each predefined monitoring period is determined as the integral of the mass flow rate from time $T1$ to time $T2$, where time $T1$ is the time at the commencement of each predefined monitoring period and time $T2$ is the time at the end of each predefined monitoring period.

The advantages of the invention are many. A particularly important advantage of the method according to the invention is that it allows the mass flow rate of a liquid medium flowing through a pipe to be determined with a reasonable degree of accuracy, and in particular, it allows the mass flow rate of a liquid phase medium flowing with a gaseous phase medium in a pipe to be determined with a reasonable degree of accuracy. In particular, the method according to the invention allows a relatively accurate determination of the mass flow rate of milk flowing with air through a pipe, for example, a milk line in pulsed flow with time spaced apart slugs of milk. Additionally, the method according to the invention allows the disengagement of a milking cluster from the teats of an animal during milking, for example, by kick-off to be detected, and the method according to the invention also allows commencement and completion of milking of an animal to be determined with a reasonable degree of accuracy. Further, the method according to the invention allows the connection of a milking cluster to the teats of an animal to be detected.

The advantages of the device according to the invention are substantially similar to those achieved from the method according to the invention.

Figure 1:
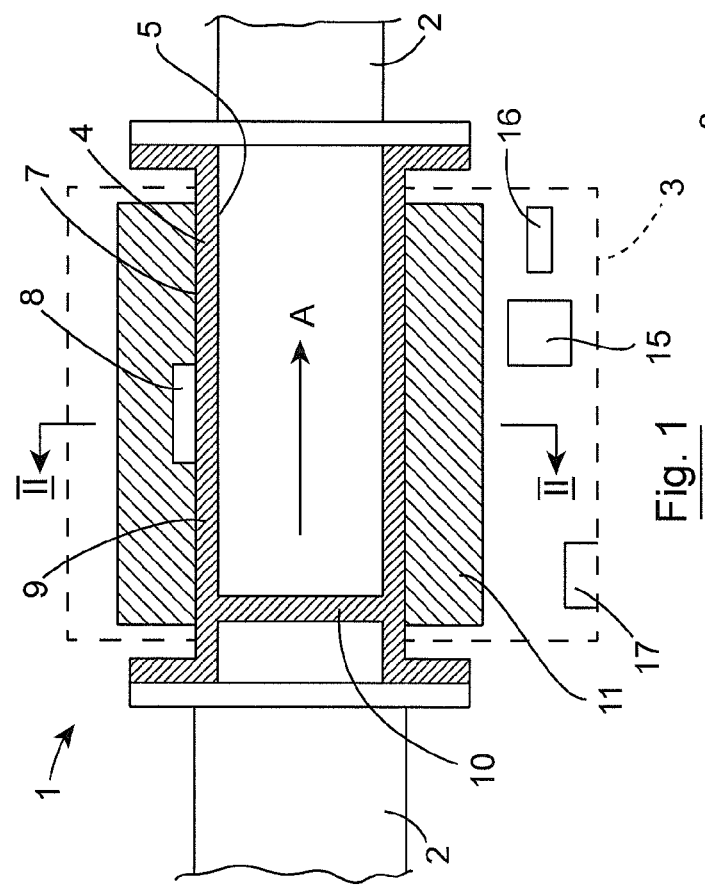
Figure 3:
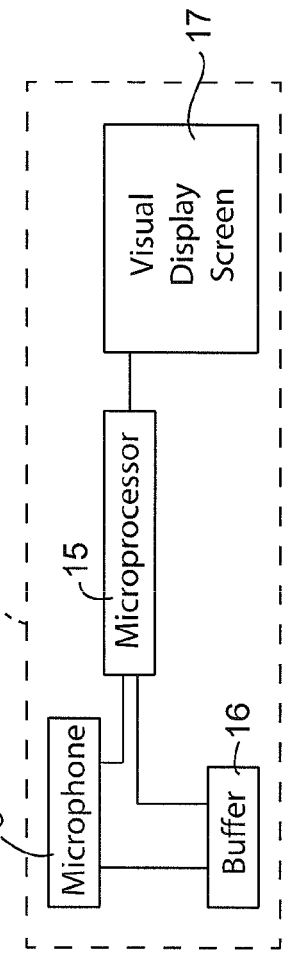

The invention will be more clearly understood from the following description of some preferred embodiments thereof, which are given by way of example only, with reference to the accompanying drawings, in which:

FIG. 1 is a cross-sectional side elevational view of a device according to the invention for determining the mass flow rate of a liquid flowing in the pipe, FIG. 2 is a transverse cross-sectional view of the device of FIG. 1 on the line II-II of FIG. 1, and FIG. 3 is a block representation of the device of FIG. 1.

Referring to the drawings, there is illustrated a device according to the invention, indicated generally by the reference numeral 1, for determining the mass flow rate of a flowing liquid phase medium, which in this embodiment of the invention is milk turbulently flowing with a gaseous phase medium, namely, air in a pipe 2 of milking apparatus (not shown) through which milk is drawn under vacuum from the teats of an animal. In this embodiment of the invention the milk is flowing in the pipe 2 as a pulsed flow comprising a plurality of time spaced apart slugs of the milk, typically in the form in which milk is drawn under vacuum in intermittent slugs from the teats of an animal being milked with air interspersed between the milk slugs. The device 1 comprises a housing 3 which is indicated diagrammatically in broken lines in FIG. 1 and a pipe element 4 extending through the housing 3 and defining a bore 5 extending therethrough for accommodating milk and air flowing through the device 1. The housing 3 is adapted for connecting into the pipe 2 of the milking apparatus (not shown) through which the milk and air is flowing with the pulsating flow under vacuum, so that the milk and air flowing through the pipe 2 flows through the bore 5 of the pipe element 4 in the direction of the arrow A.

A monitoring means comprising a microphone 8 for monitoring sonic signals produced by the milk and air flowing through the bore 5 of the pipe element 4 is located adjacent the pipe element 4, and in this embodiment of the invention is secured to an external surface 7 of a wall 9 of the pipe element 4. The microphone 8 produces an electronic analogue output signal which is indicative of the sonic signal produced by the milk and air flowing through the bore 5 of the pipe element 4.

A turbulence inducing means for inducing turbulence in the milk and air flowing in the bore 5 of the pipe element 4, in this embodiment of the invention comprises a transverse turbulence inducing bar 10 extending transversely within the bore 5 of the pipe element 4 between diametrically opposite points on the wall 9 of the pipe element 4. The microphone 8 is located downstream of the turbulence inducing bar 10 in order to detect the sound of the turbulent flow of the milk and air through the bore 5 of the pipe element 4. The electronic analogue output signal produced by the microphone 8 is indicative of the sonic signal produced by the turbulent flow of the milk and air flowing through the bore 5 of the pipe element 4.

A layer 11 of a sound insulating material is wrapped around the wall 9 of the pipe element 4 with the microphone 8 located between the layer 10 of sound insulating material and the wall 9 of the pipe element 4 in order to minimise the effect of noise generated externally of the device 1 on the microphone 8. The layer 11 of the sound insulating material extends from the turbulence inducing bar 10 to a position downstream of the microphone 8 for minimising the effect on the microphone 8 of noise generated externally of the device 1.

A signal processor, in this embodiment of the invention a microprocessor 15, which is illustrated in block representation only, is located in the housing 3 and is configured to continuously sample the analogue output signal produced by the microphone 8 during sequential predefined monitoring periods, and to determine the mass flow rate of the milk flowing through the bore 5 of the pipe element 4, as will be described below. A visual display screen 17 is provided in the housing to display the mass flow rate of the milk determined by the microprocessor 15. Provision is also made for facilitating the determined mass flow rate to be read by an external computer from the microprocessor 15. In this embodiment of the invention the predefined monitoring periods are each of duration of approximately one second and run consecutively one after the other.

The output signal from the microphone 8 is continuously sampled at a sampling rate of 44.1 kHz, although the output signal produced by the microphone 8 may be sampled at any suitable sampling rate, and preferably, is sampled at a sampling rate at or above 32 kHz. The sampled values of the output signal of the microphone 8 are buffered by the microprocessor 15 into a buffer 16 during respective predefined sampling periods. The buffer 16 may be configured in the microprocessor 15 or may be an external memory, for example, a random access memory separate from the microprocessor 15, which would also be located in the housing 3. In this embodiment of the invention each predefined sampling period is of duration in order to allow 1,024 consecutive samples of the output signal of the microphone 8 to be read into the buffer 16. At the sampling rate of 44.1 kHz, the duration of each sampling period is approximately 23.2 milliseconds. At the end of each predefined sampling period, the buffered sampled values of the output signal of the microphone 8 are read from the buffer 16 into the microprocessor 15. The microprocessor 15 is configured to carry out a Fast Fourier transform on the buffered sampled values at the end of each predefined sampling period in order to produce the frequency domain of the sampled signal.

The microprocessor 15 is configured to filter the frequency domain of the sampled buffered signal resulting from the Fast Fourier Transform at the end of each predefined sampling period to attenuate signals of frequency below and above a predefined frequency bandwidth within which signals indicative of the flow of the milk through the bore 5 of the pipe element 4 occur. In this embodiment of the invention the predefined frequency bandwidth is 6 kHz to 15 kHz, which it has been found is the bandwidth within which signals indicative of the flow of milk through the bore 5 of the pipe element 4 occur.

The microprocessor 15 is configured to compute an energy parameter value of the sampled buffered signal within the predefined frequency bandwidth of 6 kHz and 15 kHz at the end of each predefined sampling period. In this embodiment of the invention the energy parameter value which is computed by the microprocessor 15 is the average energy of the sampled buffered signal within the predefined frequency bandwidth of 6 kHz to 15 kHz during the corresponding predefined sampling period. The average energy of the sampled buffered signal within the predefined frequency bandwidth of 6 kHz to 15 kHz is computed by the microprocessor 15 by computing the average amplitude value of the sampled buffered signal of amplitude values above a predefined threshold value within the predefined frequency bandwidth of 6 kHz to 15 kHz. The predefined threshold value is determined in order to remove noise from the sampled monitored signal, and may be determined by the microprocessor 15 in response to a continuing analysis of the sampled monitored signal over a predefined number of the most recent predefined sampling periods. At the end of each predefined monitoring period, the microprocessor 15 computes the average energy value of the sampled monitored signal for that predefined monitoring period from the average values computed for the respective predefined sampling periods during that predefined monitoring period.

The microprocessor 15 is configured to determine the mass flow rate of the milk flowing through the bore 5 of the pipe element 4 at the end of each predefined monitoring period by substituting the computed average energy value of the sampled buffered signal within the predefined frequency bandwidth of 6 kHz to 15 kHz into a calibration equation, which is determined during calibration of the device 1 as will be described below. In this embodiment of the invention the calibration equation is a power law equation of the following form:

$$F = a \cdot H^b$$

where

F is the mass flow rate of milk flowing through the bore 5 of the pipe element 4 during that predefined monitoring period, a and b are constants determined during calibration of the device 1, and H is the average energy value of the sampled buffered signal within the predefined frequency bandwidth of 6 kHz to 15 kHz during that predefined monitoring period.

The microprocessor 15 is configured to compute the total mass flow of milk during each predefined monitoring period by integrating the mass flow rate of the milk for that predefined monitoring period between time T1, which is the time at the commencement of that predefined monitoring period, and T2, which is the time at the end of that predefined monitoring period.

The microprocessor 15 is configured to compute the total mass of milk flowing through the bore 5 of the pipe element 4 of the device 1 during any selected time period by summing the determined masses of the milk flowing through the bore 5 of the pipe element 4 during respective consecutive predefined monitoring periods during the selected time period. For example, the microprocessor 15 may be programmed to compute the total mass of milk which flows through the device 1 during a milking cycle of an animal from the commencement of the milking cycle to the end of the milking cycle. In which case, the microprocessor 15 would be programmed to determine the total mass of the milk flowing through the device 1 during the milking cycle by summing the computed masses of the milk flowing through the device 1 during respective consecutive predefined monitoring periods during the milking cycle.

Turning now to the calibration of the device 1 and the derivation of the calibration equation, the device 1 is calibrated by initially delivering a flow of milk and air through the bore 5 of the pipe element 4 of the device 1 for predefined calibration periods at respective different milk flow rates. In this embodiment of the invention the predefined calibration periods are of duration similar to the duration of the predefined monitoring periods, and may be from one second to ten seconds, although the predefined calibration periods may be longer than the predefined monitoring periods. The milk is collected in a vessel at the end of each predefined calibration period, and the mass of milk in the vessel is measured and recorded for each predefined calibration period. The mass flow rate of the milk for each predefined calibration period is then computed and recorded cross-referenced with the corresponding predefined calibration period.

Signals from the microphone 8 are sampled by the microprocessor 15 during each predefined calibration period at the sampling rate of 44.1 kHz, and are buffered into the buffer 16, as already described at the end of respective predefined sampling periods during which 1,024 consecutive sampled values are read from the output signal from the microphone 8. At the end of each predefined sampling period, the microprocessor 15 carries out a Fast Fourier Transform on the buffered sampled signal, which is then filtered to produce the portion of the signal within the predefined frequency bandwidth of 6 kHz to 15 kHz. The microprocessor 15 then computes the average value of the energy of the sampled buffered signal within the predefined frequency bandwidth of 6 kHz to 15 kHz at the end of each predefined sampling period, and the computed average energy values are stored cross-referenced with the corresponding mass flow rates of the milk for the corresponding predefined calibration periods. The calibration equation is then derived from the stored average energy values and the corresponding mass flow rates of milk by curve fitting or by any other suitable mathematical process. The calibration equation may be a power law equation, a polynomial equation, a logarithmic equation or a mixed type equation, and as discussed above, in this embodiment of the invention the equation is a power law equation in the form:

$$F = a \cdot H^b.$$

The device 1 may also be used in order to detect the commencement of milking of an animal, the end of milking of an animal, the connection of the teat cups of a milking cluster to the teats of an animal, and/or disconnection of one or more of the teat cups of a milking cluster from the teats of an animal during milking. Disconnection or disengagement of the teat cups of a milking cluster from the teats of an animal, commonly referred to as "kick-off", generally results from an animal kicking either the milking cluster or the milk line from the milking cluster, with one of its hind legs during milking, which thus results in the milking cluster being disengaged from the teats of the animal.

During periods while the milk is flowing through the bore 5 of the pipe element 4, the milk flows with the pulsed flow, and the frequency domain of the monitored signal within the predefined bandwidth of 6 kHz to 15 kHz comprises a pulsed pattern in response to the flow of the time spaced apart slugs of the milk.

Prior to commencement of milking, and prior to attaching the milking cluster of a milk line to the teats of the animal, once the vacuum is applied to the milk line or pipeline in which the device 1 is located, the application of the vacuum to the milk line or pipeline results in air being continuously drawn into the milk line through the teat cups of the milking cluster until the milking cluster has been attached to the teats of the animal. The continuous drawing of the air through the milk line, and in turn through the bore 5 of the pipe element 4, results in significant sonic noise being detected by the microphone 8. This in turn results in the frequency domain of the output signal from the microphone 8 within the predefined frequency bandwidth of 6 kHz to 15 kHz comprising a continuous relatively high energy noise signal, which is significantly higher than the average energy signal of the output signal from the microphone 8 in the frequency bandwidth of 6 kHz to 15 kHz resulting from a normal pulsed flow of milk during milking of an animal. Similarly, in the event of the milking cluster being removed or being kicked off by the animal from the teats of the animal during milking, since the vacuum is continuously applied to the milk line during milking, the frequency domain of the monitored signal from the microphone 8 within the predefined frequency bandwidth of 6 kHz to 15 kHz is a substantially continuous signal of similar high energy noise. Thus, when the frequency domain of the signal from the microphone 8 within the predefined frequency bandwidth of 6 kHz to 15 kHz comprises a substantially continuous signal of continuous relatively high energy noise, the milking cluster is determined as being detached from the teats of the animal, and thus removal or kick-off by the animal of the milking cluster from the animal teat is readily easily determined.

Additionally, in the absence of milk flowing through the bore 5 of the pipe element 4 while the milking cluster is still attached to the teats of the animal, which would occur on completion of milking of an animal, the frequency domain of the monitored signal from the microphone 8 within the predefined frequency bandwidth of 6 kHz to 15 kHz comprises a substantially continuous low energy noise signal, which is thus indicative of the completion of milking. This low energy noise signal is of significantly lower energy value than the high energy noise signal which is indicative of the milking cluster being detached from the teats of the animal, and thus, is easily distinguishable from the high energy noise signal. Furthermore, both the substantially continuous low energy noise signal indicative of the absence of milk flowing through the bore 5 of the pipe element 4 and the substantially continuous high energy noise signal indicative of the milking cluster being detached from the teats of the animal are readily distinguishable from the pulsed signal indicative of milk flowing through the bore 5 of the pipe element 4 in pulsed milk slugs.

Accordingly, on the microprocessor 15 determining that the frequency domain of the monitored signal within the predefined frequency bandwidth of 6 kHz to 15 kHz has transitioned from the signal indicative of pulsed flow of milk to a substantially continuous low energy noise signal, the microprocessor 15 determines that milking of the animal has been completed. On the microprocessor 15 determining that the frequency domain of the monitored signal within the predefined frequency bandwidth of 6 kHz to 15 kHz has transitioned from either a substantially continuous high energy noise signal or a substantially continuous low energy noise signal to the signal indicative of milk flowing in pulsed milk slugs, the microprocessor 15 determines that milking of the animal has commenced.

On the microprocessor determining that the frequency domain of the monitored signal within the predefined frequency bandwidth of 6 kHz to 15 kHz has transitioned from the substantially continuous relatively high energy noise signal to either the signal indicative of milk flowing in pulsed milk slugs or the substantially continuous low energy noise signal, the microprocessor 15 determines that the milking cluster has been attached to the animal.

On the microprocessor 15 detecting that the frequency domain of the monitored signal within the predefined frequency range of 6 kHz to 15 kHz has transitioned from the signal indicative of milk flowing in pulsed milk slugs to a substantially continuous high energy noise signal, the microprocessor 15 determines that kick-off has occurred, in other words, the milking cluster has been kicked off by the animal from the teats of the animal.

In this embodiment of the invention the microprocessor 15 is configured to compare the computed average energy value of the monitored signal at the end of each predefined sampling period with a first predefined energy parameter value, namely, a first predefined energy value, which is indicative of air being drawn under vacuum into the milk line through the teat cups of the milking cluster. If the computed average energy value at the end of any predefined sampling period is equal to or greater than the first predefined energy value, the microprocessor 15 is configured to determine the milking clusters as being detached from the teats of the animal.

Additionally, in this embodiment of the invention the microprocessor 15 is configured to compare the computed average energy value of the monitored signal at the end of each predefined sampling period with a second predefined energy value which is indicative of the absence of milk flowing through the pipeline while the milking cluster is attached to the teats of the animal. If the computed average energy value at the end of any predefined sampling period is equal to or less than the second predefined energy value, the microprocessor determines that no milk is flowing in the pipeline, and the milking clusters are attached to the teats of the animal.

Also in this embodiment of the invention the microprocessor 15 is configured to compare the computed average energy value of the monitored signal at the end of each predefined sampling period with upper and lower third predefined energy values which are indicative of the upper and lower energy values of the average energy value of the signal when milk is flowing in the pipeline in pulses of milk slugs. If the computed average energy value of the monitored signal at the end of any predefined sampling period lies within the upper and lower third predefined energy values, then the microprocessor 15 determines that milk is flowing in the pipeline in pulsed milk slugs, and the microprocessor 15 proceeds to determine the mass flow rate of the milk flowing in the pipeline during that predefined sampling period.

In use, with this embodiment of the invention, after the microprocessor 15 has computed the average energy value of the monitored signal within the predefined frequency bandwidth of 6 kHz to 15 kHz at the end of each predefined sampling period, the microprocessor 15 compares the computed average energy value with the upper and lower third predefined energy values. If the computed average energy value lies within the upper and lower third predefined energy values, the microprocessor 15 proceeds to compute the mass flow rate of the milk flowing in the milk line during that predefined sampling period from the calibration equation.

If at the end of any predefined sampling period the computed average energy value for that predefined sampling period does not fall within the upper and lower third predefined energy values, the microprocessor 15 compares the computed average energy value with the first predefined energy value, and if the computed average energy value is equal to or greater than the first predefined energy value, and if the microprocessor 15 determines that the computed average energy value has just transitioned from being indicative of milk flowing in the pipeline to being equal to or greater than the first predefined energy value, the microprocessor 15 determines "kick-off", in other words, that the milking cluster has been kicked off from the teats of the animal during milking by the animal.

If, on the other hand, a computed average energy value at the end of any predefined sampling period does not fall within the upper and lower third predefined energy values and is less than the first predefined energy value, the microprocessor 15 compares the computed average energy value with the second predefined energy value. If the computed average energy value is equal to or less than the second predefined energy value, the microprocessor 15 determines that no milk is flowing in the pipeline and the milking cluster is attached to the teats of the animal. If the microprocessor 15 determines that the monitored signal has just transitioned from being indicative of milk flowing in the pipeline to being less than or equal to the second predefined energy value, the microprocessor 15 determines that milking of the animal has ceased.

If the microprocessor 15 at the end of any predefined sampling period determines that the computed average energy value has just transitioned from being either equal to or greater than the first predefined energy value or being equal to or less than the second predefined energy value to being within the upper and lower third predefined energy values, the microprocessor 15 determines that milking of the animal has just commenced.

If the microprocessor 15 at the end of any sampling period determines that the computed average energy value has just transitioned from being greater than or equal to the first predetermined energy value to either being indicative of milk flowing in the pipeline or being equal to or less than the second predefined energy value, the microprocessor 15 determines that the milking cluster has been attached to the teats of the animal.

It is envisaged that as well as or instead of comparing the computed average energy values of the monitored signal within the predefined frequency bandwidth of 6 kHz to 15 kHz with the upper and lower third predefined energy values in order to detect the presence of milk flowing in the pipeline, the microprocessor 15 may be configured to detect the presence of milk flowing in the pipeline by comparing a pattern defined by a plurality of computed average energy values, and preferably a plurality of consecutive computed average energy values during a predefined time period of duration, for example, of 0.5 seconds to 20 seconds, and preferably, 1 second to 15 seconds, and advantageously, 1 second to 10 seconds, and ideally, 1 second to 5 seconds, with a predefined pattern indicative of milk flowing through a pipeline in pulsed milk slugs in order to determine the presence of milk flowing in the pipeline. Alternatively, the microprocessor may be configured to analyse such a plurality of consecutive computed average energy values over such a predefined time period to ascertain if the analysed consecutive computed average energy values are indicative of milk flowing in a pipeline in pulsed milk slugs.

It is also envisaged that instead of or as well as comparing the computed average energy value with the second predefined energy value in order to determine the end of milking of an animal, the microprocessor 15 may be configured to determine the time spacing between consecutive slugs of milk from a plurality of the computed average energy values, and preferably, from a plurality of consecutive ones of the computed average energy values, and the end of milking of an animal would be detected in response to the time spacing between the consecutive milk slugs being indicative of substantially no milk flowing in the pipeline.

It will be appreciated that since the first, second and upper and lower third predefined energy values will vary depending on the type of animal being milked and on each device, and also the time spacing between the milk slugs which would be indicative of virtually no milk flowing in the pipeline will also be dependent on the type of animal being milked and the device, the first, second and upper and lower third predefined energy values, as well as the time spacing between consecutive milk slugs indicative of substantially no milk flowing in the pipeline will be determined by trial during calibration of the device. Although, it is envisaged that in general a time spacing between consecutive milk slugs of the order of ten seconds or more, in general, would be indicative of substantially no milk flowing in the pipeline, and would thus be indicative of the end of milking of an animal.

It will be appreciated that the detection by the microprocessor 15 of the commencement of milking and the end of milking, as well as the detection of connection of the milking cluster to the teats of the animal, and kick-off may be detected by the microprocessor in cases where the microprocessor is configured to determine the mass flow rate of milk flowing in the pipe 2 by using other criteria than those described for determining the mass flow rate of the milk flowing with pulse flow through a pipe. In which case, the substantially continuous relatively high energy signal indicative of kick-off and the substantially continuous relatively low energy signal indicative of the absence of milk flowing in the pipeline while the milking cluster is still attached to the teats of the animal would still be distinguishable from the signal indicative of milk flowing through the pipeline in pulsed milk slugs, and thus, kick-off and the commencement and ending of milking of an animal as well as connection and disconnection of the milking cluster to and from the teats of the animal would still be detectable by the microprocessor 15.

It is also envisaged that the device according to the invention may be provided to detect any one or more of the presence or absence of milk flowing in a pipeline, the commencement and ceasing of milk flowing in a pipeline, the commencement and ending of milking of an animal, the disconnection of a milking cluster from the teats of animal during milking (kick-off), the connection and disconnection of a milking cluster to and from the teats of an animal, without being provided to determine the mass flow rate and/or the total mass flow of milk through a pipeline. It is further envisaged that in cases where the device is provided to detect any one or more of the presence or absence of milk flowing in a pipeline, the commencement and ceasing of milk flowing in a pipeline, the commencement and ending of milking of an animal, the disconnection of a milking cluster from the teats of an animal during milking (kick-off), the connection and disconnection of a milking cluster to and from the teats of an animal, the device may also be provided to determine the mass flow rate and/or the total mass flow of milk through a pipeline, and in which case, it is envisaged that the means for determining the mass flow rate and/or the total mass flow of milk flowing through a pipeline may be similar to or different from that of the device described herein.

While the device has been described as comprising a microphone attached to the wall of the pipe element through which the milk and air are flowing, it is envisaged in certain cases that the microphone may be located within the pipe. For example, it is envisaged that the microphone may be located within the turbulence inducing means. It will also be appreciated that while the turbulence inducing means has been described as a turbulence inducing bar extending diametrically within the bore 5 of the pipe element, any other suitable turbulence inducing means may be provided. Indeed, in certain cases, it is envisaged that the turbulence inducing means may be provided as a relatively small projection extending inwardly into the pipe from the pipe wall, or may be provided by a number of inwardly directed projections extending into the pipe from the pipe wall or by a number of turbulence inducing bars or members spaced apart longitudinally along the pipe element.

It will also be appreciated that while the monitoring means has been described as a monitoring means for monitoring sonic signals produced by the turbulent flow of the milk and air in the pipe, the monitoring means could be such as would detect ultrasonic signals from the turbulent flow of the milk and air, or any other audible noise signals produced by the turbulent flow of the milk and air through the pipe element.

While the device according to the invention has been described as comprising a layer of sound insulating material wrapped around the wall of the pipe element in order to minimise the effect of externally generated noise on the microphone, it is envisaged that it may be preferable to omit the sound insulating layer, and in which case the monitored signal would be filtered in order to remove externally generated noise. The filtering of the monitored signal could be carried out on the analogue signal produced by the microphone or on the digital signal, after sampling of the analogue signal. The digital filtering could be carried out directly on the digital form of the signal immediately after sampling, and more preferably would be carried out on the frequency domain of the monitored signal. The filtering would remove or attenuate signals within a frequency range indicative of the externally generated noise. Alternatively, it is envisaged that in cases where the sound insulating layer is omitted, the effect of external noise on the microphone could be minimised by a noise cancellation process by using an additional externally located microphone to pick up external noise. The signals from the two microphones would then be compared in order to cancel the external noise.

It is also envisaged that the turbulence inducing means may be dispensed with, as in general the flow of milk and air in the pipe element may have sufficient natural turbulence.

While the device has been described for monitoring the mass flow rate of milk turbulently flowing with air through a pipe, it will be appreciated that the device according to the invention may be used for monitoring the mass flow rate of any liquid phase medium turbulently flowing with a gaseous phase medium in a pipe or other conduit.

While the device and the method have been described for determining the mass flow of milk flowing with pulsed flow in the form of time spaced apart intermediate slugs in a gaseous phase medium, it is envisaged that the device and method may be used for determining mass flow of a liquid flowing in a pipe in which the liquid is the only medium flowing in the pipe, and may be flowing with continuous laminar flow, turbulent flow or pulsed flow. It will also be appreciated that the device and method may be used for determining the mass flow of a liquid phase medium flowing along with a gaseous phase medium whereby the liquid phase medium is a continuous flowing medium, and is flowing with laminar or turbulent flow characteristics.

Additionally, it is envisaged that the device and method may be used for detecting flow of a liquid phase medium flowing in a pipe with a gaseous phase medium where the gaseous phase medium is dispersed in bubbles in the liquid phase medium, or where the liquid phase medium and the gaseous phase medium are stratified in the pipe, or where the liquid phase medium is dispersed in the gaseous phase medium, and where the liquid phase medium is flowing in an annular flow with the gaseous phase medium located in a core defined by the annular liquid phase medium flow. The device and method may also be used in determining the mass of a liquid phase medium flowing with a gaseous phase medium in which the flow of the liquid and gaseous phase medium is a churn type flow.

Additionally, it will be appreciated that while the mass flow rate has been determined by substituting the average value of the energy of the sampled signal within the predefined frequency bandwidth of 6 kHz to 15 kHz into a calibration equation, any other suitable means for determining the mass flow rate from the computed average energy value of the signal within the predefined frequency bandwidth may be used, for example, it is envisaged that the computed average energy value of the sampled signal within the predefined frequency bandwidth may be compared with a plurality of calibration average energy values which would be cross-referenced with corresponding calibration mass flow rates, and the mass flow rate of the liquid would be determined as being the calibration mass flow rate corresponding to the calibration average energy value closest to the computed average energy value.

While the frequency domain of the monitored signals has been derived by carrying out a Fast Fourier Transform on the sampled monitored signal from the microphone at the end of each predefined sampling period, any other suitable means for producing the frequency domain of the monitored signal may be used, or a digital filter may be implemented on the microprocessor to filter the signal.

It will also be appreciated that when calibrating the device it will be calibrated in the orientation in which it is to be used, for example, if the device is to be located in a horizontally extending pipe, calibration of the device will be carried out with the pipe element 4 extending horizontally, and on the other hand, if the device is to be located in a vertically extending pipe or a pipe extending at an angle to the horizontal between horizontal and vertical, then calibration of the device will be carried out with the pipe element 4 extending vertically or at an angle to the horizontal corresponding to the use angle.

Needless to say, the device will be calibrated separately for respective liquids, for example, milk, water or other liquids the mass flow rates of which are to be determined by the device. Alternatively, it is envisaged that the device may be calibrated with one liquid, and by applying respective predetermined correction factors for respective different liquids, the device would then be automatically calibrated for such other liquids. For example, the device could be calibrated using water as the calibration liquid, and a predetermined correction factor could be used to automatically calibrate the device for monitoring mass flow of milk, and needless to say, other correction factors could be determined for other liquids, and such predetermined factors would then be applied depending on the liquid for which the device is to be used.

While the device has been described as comprising a visual display screen, it will be readily apparent to those skilled in the art that in certain cases, the visual display screen may be omitted, and the device would merely produce raw data, which could then be read by a computer or other signal processing device for display on any suitable visual display, for example, a user interface, a personal computer, or indeed, a smart mobile phone using a near field wireless communications protocol, or any other suitable communicating means be it hard-wired or wireless.

The invention claimed is:

1. A method for determining a mass flow rate of milk flowing turbulently in a pipe with a gaseous phase medium as a pulsed flow comprising a plurality of time spaced apart slugs of milk with air interspersed therebetween, the method comprising:
   monitoring a signal derived from a microphone located adjacent the pipe or within the pipe indicative of a sonic signal produced by the turbulently flowing spaced apart milk slugs in the pipe,
   filtering a frequency domain of the monitored signal to produce a portion of the monitored signal within a predefined frequency bandwidth indicative of milk flowing in the pipe,
   computing an energy parameter value of the portion of the monitored signal within the predefined frequency bandwidth,
   substituting the computed energy parameter value of the portion of the monitored signal within the predefined frequency bandwidth in a calibration equation,
   the calibration equation being expressed as a power law equation derived from a system of calibration energy values and corresponding calibration mass flow rates, and
   determining the mass flow rate of the milk from the calibration equation with the computed energy parameter value substituted therein.

2. A method as claimed in claim 1 in which the computed energy parameter value of the monitored signal within the predefined frequency bandwidth is computed by computing an average energy value of the monitored signal within the predefined frequency bandwidth.

3. A method as claimed in claim 1 in which the monitored signal is sampled at a predefined sampling rate during sequential predefined monitoring periods.

4. A method as claimed in claim 3 in which the mass flow rate of the milk is determined at an end of each predefined monitoring period for that predefined monitoring period.

5. A method as claimed in claim 1 in which the predefined frequency bandwidth within which the computed energy parameter value of the monitored signal is computed lies in the range of 6 kHz to 15 kHz.

6. A method as claimed in claim 1 in which the method further comprises determining the system of calibration energy values and the corresponding calibration mass flow rates for the milk by delivering the milk to the pipe to flow turbulently with a gaseous phase medium as a pulsed flow comprising a plurality of time spaced apart slugs of milk with air interspersed therebetween through the pipe for predefined calibration periods at respective different mass flow rates, the mass of the milk delivered through the pipe during each predefined calibration period being recorded, and the mass flow rate of the milk for each predefined calibration period is determined and cross-referenced with the recorded mass of the milk for the corresponding predefined calibration period, the mass flow rate of the milk being determined for each predefined calibration period by computing an energy parameter value of a portion of a monitored signal indicative of a sonic signal produced by the flowing milk within a predefined frequency bandwidth indicative of the flowing milk for each predefined calibration period.

7. A method as claimed in claim 6 in which the calibration equation comprises a power law equation.

8. A method as claimed in claim 1 in which the method further comprises determining the absence of the milk flowing in the pipe, the absence of milk flowing in the pipe being determined in response to a change in the pattern of the frequency domain of the sampled monitored signal within the predefined frequency bandwidth.

9. A method as claimed in claim 1 in which the energy parameter value of the monitored signal within the predefined frequency bandwidth is computed by computing the average energy value of the energy values of the monitored signal over a predefined threshold energy value within the predefined frequency bandwidth.

10. A method as claimed in claim 1 in which the frequency domain of the sampled monitored signal is produced by applying a Fast Fourier Transform to the sampled monitored signal.

11. A method as claimed in claim 1 in which turbulence is induced in the milk.

12. A device for determining a mass flow rate of milk flowing turbulently in a pipe with a gaseous phase medium as a pulsed flow comprising a plurality of time spaced apart slugs of milk with air interspersed therebetween, the device comprising:

a microphone located adjacent the pipe or within the pipe configured to monitor a signal indicative of a sonic signal produced by the turbulently flowing spaced apart milk slugs in the pipe, a filter configured to filter the frequency domain of the monitored signal to produce a portion of the monitored signal within a predefined frequency bandwidth indicative of milk flowing in the pipe, and a signal processor configured to compute an energy parameter value of the portion of the monitored signal within the predefined frequency bandwidth, to substitute the computed energy parameter value of the portion of the monitored signal within the predefined frequency bandwidth in a calibration equation, the calibration equation being expressed as a power law equation, derived from a system of calibration energy values and corresponding calibration mass flow rates, and to determine the mass flow rate of the milk from the calibration equation with the computed energy parameter value substituted therein.

\* \* \* \* \*

UNITED STATES PATENT AND TRADEMARK OFFICE
CERTIFICATE OF CORRECTION

| | |
|---|---|
| PATENT NO. | : 11,555,724 B2 |
| APPLICATION NO. | : 16/596998 |
| DATED | : January 17, 2023 |
| INVENTOR(S) | : John Gerard Daly et al. |

It is certified that error appears in the above-identified patent and that said Letters Patent is hereby corrected as shown below:

In the Specification

Column 10, Line 63, please change "$F=a \cdot H^b$" to --$F=a.H^b$--

Column 12, Line 5, please change "$F=a \cdot H^b$." to --$F=a.H^b$.--

Signed and Sealed this
Eighteenth Day of April, 2023

Katherine Kelly Vidal
*Director of the United States Patent and Trademark Office*